United States Patent [19]

Paul et al.

[11] Patent Number: 4,948,666

[45] Date of Patent: Aug. 14, 1990

[54] STAIN RESISTANT POLYCARBONATE PANELS

[75] Inventors: Winfried G. Paul; Sivaram Krishnan, both of Pittsburgh; Larry D. Sarver, Wexford, all of Pa.

[73] Assignee: Mobay Corporation, Pittsburgh, Pa.

[21] Appl. No.: 184,850

[22] Filed: Apr. 22, 1988

[51] Int. Cl.$^5$ .................. B32B 27/36; C08G 63/62
[52] U.S. Cl. .................................... 428/334; 428/412; 264/176.1
[58] Field of Search ................ 428/412, 334

[56] References Cited

U.S. PATENT DOCUMENTS 3,892,889 7/1975 Cohnen et al. .................. 427/160

FOREIGN PATENT DOCUMENTS 1208873  8/1986  Canada .
110221   4/1987  European Pat. Off. .
1670951  2/1971  Fed. Rep. of Germany .
3617978  12/1987 Fed. Rep. of Germany .
2028228  3/1980  United Kingdom .

Primary Examiner—P. C Ives
Attorney, Agent, or Firm—Joseph C. Gil; Aron Preis

[57] ABSTRACT

The present invention is related to a stain resistant polycarbonate panel which preferably comprises coextruded polycarbonate sheet and an adherent layer based on linear polycarbonate resin which contains an additive conforming to

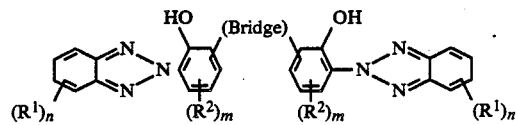

wherein $R^1$ and $R^2$ independent of each other are a hydrogen or a halogen atom, a $C_1$–$C_{12}$ alkoxy, $C_7$–$C_{18}$ arylalkoxy or a $C_1$–$C_{10}$ alkyl, cycloalkyl, arylalkyl or an aryl radical and $R^3$ and $R^4$ independent of each other are a hydrogen atom, a $C_1$–$C_{10}$ alkyl, cycloalkyl, arylalkyl or an aryl radical, n is an integer of 0–4 and m is an integer of 1 to 3, +Bridge+ is either

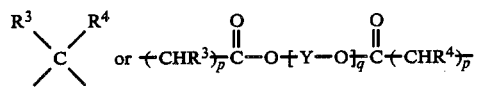

where p is 0–3, q is 1–10, Y denotes any of

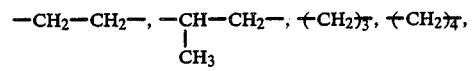

and $R^3$ and $R^4$ independently denote a hydrogen atom a $C_1$–$C_{10}$ alkyl, cycloalkyl, arylalkyl or an aryl radical characterized in that said adherent layer is about 5 to 100 microns in thickness and in that only one of its surfaces is bonded.

4 Claims, No Drawings

STAIN RESISTANT POLYCARBONATE PANELS

FIELD OF THE INVENTION

The invention relates to stain resistant panels made primarily of polycarbonate resin.

BACKGROUND OF THE INVENTION

Polycarbonate resins are characterized by their transparency, mechanical strength and dimensional stability. These properties make polycarbonate an ideal choice for the preparation of sheets to be used in glazing. One of the drawbacks to the use of polycarbonate as front panels in vending machines is that they stain upon coming into contact with staining foods.

It is an object of the invention to provide polycarbonate based sheets which are resistant to such staining.

The art is noted to include Canadian Patent 1,208,873 which disclosed a polycarbonate-based panel made resistant to UV radiation. Accordingly, a panel is structured to include a core layer of polycarbonate to which there is adhesively bonded an intermediate UV absorption layer and a cover layer. The purpose of the cover layer is to prevent vaporization of the UV absorber from the intermediate layer. The intermediate, UV-absorption layer may be prepared from polycarbonate and contains derivatives of benzotriazole as UV absorbers. Also noted is German Patent Application 1,670,951 which disclosed polycarbonate molded articles, including ribbons which are rendered resistant to UV radiation by incorporating the bis-benzotriazole compound of the present invention therewith. A method for coating a polycarbonate sheet with a protective layer was disclosed in UK Patent Application 2,028,228. A layer preferably of polymethacrylate and advantageously containing a UV absorber is said to be applied to the sheet by co-extrusion. U.S. Pat. No. 3,892,889 discloses UV stabilized polycarbonate moldings the surfaces of which have been treated with a solution containing a benzotriazole. German DE-OS 3,617,978 discloses co-extruded sheets based on a polycarbonate resin which sheets are covered by a UV absorbing layer made from a branched polycarbonate resin containing the bis-benzotriazole of the present invention. Also relevant is European patent application 110,221 which disclosed a panel consisting of a core layer of polycarbonate containing not more than 0.5 wt. percent of a UV absorber and having on at least one side a coating layer which has been co-extruded with the core and which contains at least 3 percent of a UV absorber.

SUMMARY OF THE INVENTION

A polycarbonate sheet is rendered improved stain resistant by coating at least one of its surfaces with an adherent layer which comprises a linear polycarbonate resin and a certain bis-benzotriazole. In a preferred embodiment the sheet and the layer are co-extruded and brought into contact at their surfaces while both are at an elevated temperature resulting from the extrusion to effect adhesion.

DETAILED DESCRIPTION OF THE INVENTION

The polycarbonate resins useful in the practice of the invention are homopolycarbonate, copolycarbonate and terpolycarbonate resins or mixtures thereof. Preferably, the polycarbonate resins have molecular weights of 18,000–200,000 (weight average molecular weight), more preferably 20,000–80,000, and may alternatively be characterized by their melt flow of 1–65 gm/10 min. at 300° C. per ASTM D-1238. These polycarbonates may be prepared, for example, by the known diphasic interface process from phosgene and dihydroxy compounds by polycondensation (see German DOS 2,063,050; 2,063,052; 1,570,703; 2,211,956; 2,211,957 and 2,248,817 and French Patent 1,561,518 and the monograph, H. Schnell, *Chemistry and Physics of Polycarbonates*, Interscience Publishers, New York 1964, all incorporated herein by reference).

In the present context, dihydroxy compounds suitable for the preparation of the polycarbonates of the invention conform to the structural formulae (1) or (2)

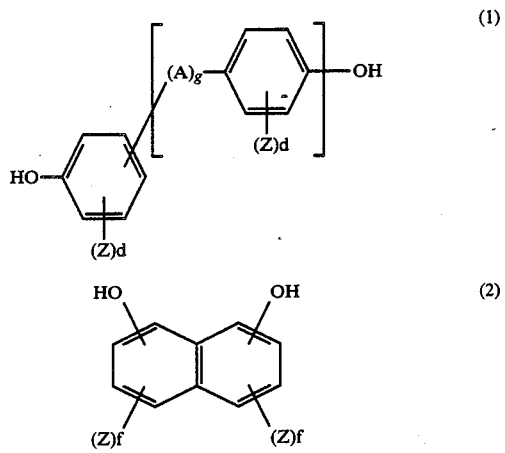

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —SO$_2$-radical; or a radical of the general formula

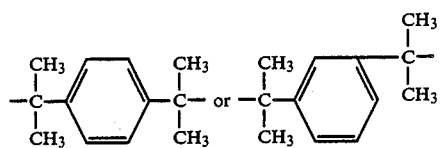

g denotes the number 0 or 1;
e denotes the number 0 or 1;
Z denotes F, Cl, Br or a C$_1$–C$_2$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α, α-bis-(hydroxphenyl)-diisopropyl-benzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) 1,570,703; 2,063,050; 2,063,052; 2,211,956 and 2,211,957, in French Patent Specification 1,561,418 and in the monograph, H. Schnell, *Chemistry and Physics of Polycarbonates*, Interscience Publishers, New York, 1964. Further examples of suitable dihydroxy compounds are 2,2-bis-(4-hydroxyphenyl)-propane (bisphenol A), 2,4-bis-(4-hydroxyphenyl)-2-methyl-butane, 1,1-bis-(4-hydroxphenyl)-cyclohexane, α,α-bis-(4-hydroxyphenyl)-p-diisopropyl-benzene, 2,2-bis-(3-chloro-4-hydroxyphenyl)-propane, hydroxybenzophenone and 4,4'-sulfonyl diphenol; the most preferred one is 2,2-bis-(4-hydroxyphenyl)-propane (bisphenol A).

The polycarbonates of the invention may entail in their structure, units derived from one or more of the suitable dihydroxy compounds.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention monofunctional reactants such as monophenols may be used in order to limit their respective molecular weights. Branching agents may also be employed in the resin used to prepare the sheet- the core layer or substrate of the present invention. Branching may be obtained by the incorporation of small amounts, preferably of between about 0.05 and 2.0 mol % (relative to diphenols employed), of trifunctional or more than trifunctional compounds, especially compounds having three or more aromatic hydroxyl groups. Polycarbonates of this type are described, for example, in German Offenlegungsschriften (German Published Specifications) 1,570,533; 1,595,762; 2,116,974 and 2,113,347; British Specification 1,079,821 and U.S. Pat. No. 3,544,514 (incorporated herein by reference).

The adherent layer in the present context is prepared from a linear polycarbonate.

Some examples of compounds with three or more than three phenyl hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)phenyl)-orthoterephthalic acid ester, tetra-(4-hydroxyphenyl)-methane tetra-(4-(4-hydroxyphenylisopropyl)phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl-2-oxo-2,3-dihydroindole.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein. The bis-benzotriazole of the present invention conforms to formula (3)

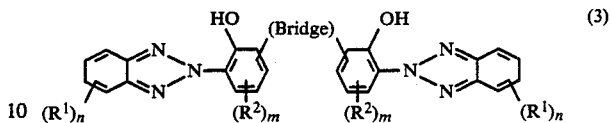

where ─(Bridge)─ is either

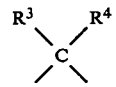

in which case it is preferred that the OH is in a ortho-position to the bridging group or ─(bridge)─ is

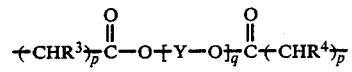

where p is an integer of 0–3, q is an integer of 1 to 10 and Y denotes $-CH_2-CH_2-$, $-\underset{\underset{CH_3}{|}}{CH}-CH_2-$, $+CH_2\}_3$, $+CH_2\}_4$, $+CH_2\}_5$, or $+CH_2\}_6$, in which case it is preferred that the OH group be in a para-position to the bridging group. In the above formula $R^1$ and $R^2$ independent of each other are a hydrogen or a halogen atom, a $C_1$–$C_{12}$ alkoxy, $C_7$–$C_{18}$ arylalkoxy or a $C_1$–$C_{10}$ alkyl, cycloalkyl, aralkyl or an aryl radical and $R^3$ and $R^4$ independent of each other are a hydrogen atom, a $C_1$–$C_{10}$ alkyl, cycloalkyl, arylalkyl or an aryl radical, n is an integer of 0–4 and m is an integer of 1–3.

In a more preferred embodiment where ─Bridge─ is

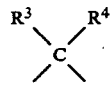

$R^3$ and $R^4$ are hydrogen atoms, n is 0, m is 1 and $R^2$ is a tertiary octyl radical. Another preferred embodiment is represented by a bis-benzotriazole where ─Bridge─ denotes

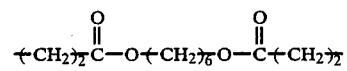

and is para-positioned to the OH groups and $R^2$ is a tertiary butyl, ortho-positioned to the hydroxyl groups.

The polycarbonate sheet of the invention may be prepared by extrusion in a known manner. It may be clear or pigmented and its thickness may preferably be in the range of ⅛"–¼" although this is not critical to the invention. Extrusion of polycarbonates to form sheets is known and had been disclosed in the art.

The adherent layer of the invention comprises a polycarbonate resin and about 1 to 15 percent, relative to its weight, of the bis-benzotriazole of formula (3). An adherent layer having a thickness of about 5 to 100 microns is preferred.

In the practice of the invention a panel is prepared by adhesively binding at least one face of the polycarbonate sheet with the face of the adherent layer. The panel of the invention therefore is characterized in that it comprises (i) a polycarbonate sheet made preferably by extrusion and having a thickness of preferably up to ¼" and (ii) an adherent layer made of polycarbonate resin and containing a bis-benzotriazole, in contact with at least one face of said sheet. The panel is further characterized in that said adherent layer is the top layer. That is to say that no further layers are applied on its face which is away from the polycarbonate sheet. While the panel may include other, intermediate layers interposed between said sheet and said adherent layer and while an adherent layer may be applied to either one or both faces of the sheet, the second surface of the adherent layer is not covered in any way and is the surface which is designated to come into contact with the staining liquids.

In a preferred embodiment the sheet and adherent layer are co-extruded by known teachings and their surfaces are brought into contact at an elevated temperature resulting from the extrusion optionally in combination with the application of pressure, to effect adhesion of the sheets. Co-extrusion is a method well known in the art.

The invention is further illustrated, but is not intended to be limited by the following examples in which all parts and percentages are by weight unless otherwise specified.

EXAMPLES

A polycarbonate sheet has been co-extruded with an adherent layer containing the preferred bis-benzotriazole of the invention. A panel was prepared by bringing the corresponding surfaces into contact immediately after extrusion. As a control, a similar panel was prepared wherein the adherent layer contained a benzotriazole of the following formula

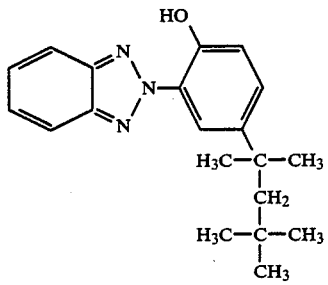

(4)

The panels were tested in accordance with ASTM D 2255-68 (reapproved 1977) against various staining food materials including mustard, ketchup, mayonnaise, relish, Guiness dark beer, Coca-Cola, grape juice and chocolate milk. After 16 hours at 50° C. in contact with the food materials the excess food material was removed first with a soft dry cloth and then by rinsing the samples with distilled water. Haze was then measured in accordance with ASTM D 1003-61 using a Diano Match Scan Spectrophotometer.

In all cases, the sheet was prepared from a Bisphenol-A based linear polycarbonate having a relative viscosity of about 1.31 and the adherent layer, approximately 80 microns in thickness, consisted of 90% of a Bisphenol-A based linear polycarbonate resin having a relative viscosity of about 1.33 and 10% of either the benzotriazole of formula (4), or the preferred bis-benzotriazole of the invention conforming to

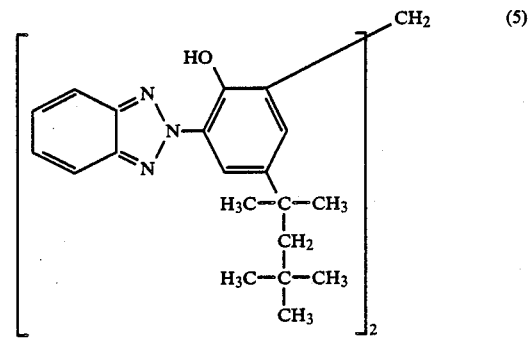

(5)

Examples 1 and 2 (see Table 1 below) shows that there is less food staining associated with the sheets of the invention.

TABLE 1

| | Haze Values | |
|---|---|---|
| | Invention #1 | Control #2 |
| CONTROL | 0.17 | 0.15 |
| MUSTARD | 0.79 | 0.87 |
| KETCHUP | 0.33 | 0.47 |
| MAYONNAISE | 0.55 | 0.62 |
| RELISH | 0.37 | 1.12 |
| BEER | 0.20 | 0.36 |
| COKE *brand beverage | 0.31 | 0.39 |
| GRAPE JUICE | 0.33 | 0.43 |
| CHOCOLATE MILK | 0.71 | 1.11 |

*Coke is a registered trademark. The Coca-Cola Company, Wilmington, Delaware.

In the context of preparing co-extruded panels having a polycarbonate sheet as a core and an adherent layer of linear polycarbonate containing a bis-benzotriazole in accordance with the invention it is important to have good melt stability for the resin for preparing the adherent layer. It was therefore surprising and unexpected that the melt stability of linear polycarbonate which contains the bis-benzotriazole is better than that of a corresponding branched resin and of either linear or branched resins which contain the benzotriazole of formula (4) above. The melt stability was determined according to ASTM D 3835 for the noted compositions which contained 10% of the additive in resins having comparable molecular weight (about 32,000)

| polycarbonate melt viscosity, Pa.s | 1 2 benzotriazole of formula (4) | | 3 4 bis-benzotriazole of formula (5) | |
|---|---|---|---|---|
| | linear | branched | linear | branched |
| 5 min. at 56.7 sec⁻¹ | 227 | 288 | 443 | 644 |
| 35 | 113 | 84 | 356 | 423 |
| 65 | 84 | 39 | 309 | 257 |
| loss (%) over 60 minutes | 63 | 86 | 30 | 60 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate panel comprising a polycarbonate sheet to which at least one of its surfaces there is bonded an adherent layer which includes a linear polycarbonate resin and about 1-15% of a bis-benzotriazole conforming to

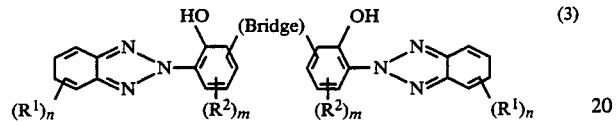 (3)

wherein $R^1$ and $R^2$ independent of each other are a hydrogen or a halogen atom, a $C_1$-$C_{12}$ alkoxy, $C_7$-$C_{18}$ arylalkoxy or a $C_1$-$C_{10}$ alkyl, cycloalkyl, arylalkyl or an aryl radical and $R^3$ and $R^4$ independent of each other are a hydrogen atom, a $C_1$-$C_{10}$ alkyl, cycloalkyl, arylalkyl or an aryl radical, n is an integer of 0-4 and m is an integer of 1 to 3, —(Bridge)— is either

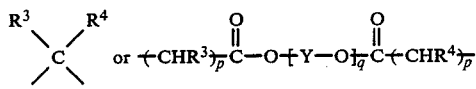

where p is 0-3, q is 1-10 Y denotes any of $-CH_2-CH_2-$, $-CH(CH_3)-CH_2-$, $-(CH_2)_3-$, $-(CH_2)_4-$, $-(CH_2)_5-$, and $-(CH_2)_6-$, and $R^3$ and $R^4$ independently denote a hydrogen atom a $C_1$-$C_{10}$ alkyl, cycloalkyl, arylalkyl or an aryl radical characterized in that said adherent layer is about 5 to 100 microns in thickness and in that only one of its surfaces is bonded.

2. The panel of claim 1 wherein said bis-benzotriazole is characterized in that —(Bridge)— is

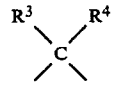

positioned ortho to the hydroxy groups, $R^3$ and $R^4$ are hydrogen atoms, n is 0, m is 1 and $R^2$ is a tertiary octyl radical in a para-position to the hydroxyl group.

3. The panel of claim 1 wherein said bis-benzotriazole is present in said adherent layer at an amount of about 3 to 10% relative to the weight of said layer.

4. The panel of claim 1 wherein said —Bridge— denotes

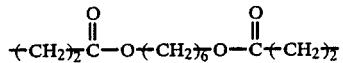

in a para-position to said hydroxyl groups and $R^2$ is tertiary butyl, positioned ortho to said hydroxyls.

* * * * *